US006984701B2

(12) United States Patent
Sacoto et al.

(10) Patent No.: US 6,984,701 B2
(45) Date of Patent: Jan. 10, 2006

(54) POLYMERIC DISPERSANTS TO IMPROVE SMEAR IN PRINTING

(75) Inventors: Paul Sacoto, Lexington, KY (US); Jing X. Sun, Lexington, KY (US); Naiyu Sun, Lexington, KY (US)

(73) Assignee: Lexmark International, Inc., Lexington, KY (US)

( * ) Notice: Subject to any disclaimer, the term of this patent is extended or adjusted under 35 U.S.C. 154(b) by 159 days.

(21) Appl. No.: 10/304,592

(22) Filed: Nov. 26, 2002

(65) Prior Publication Data

US 2004/0102541 A1 May 27, 2004

(51) Int. Cl.
*C08F 265/06* (2006.01)
*C08F 265/00* (2006.01)
*C08F 261/06* (2006.01)
*C08L 51/00* (2006.01)
*C09D 11/10* (2006.01)

(52) U.S. Cl. .............. 525/503; 525/309; 525/312; 525/451; 523/160; 524/504

(58) Field of Classification Search ......... 524/504, 524/522, 523, 556, 558, 612; 523/160, 161; 106/31.6
See application file for complete search history.

(56) References Cited

U.S. PATENT DOCUMENTS 4,384,096 A * 5/1983 Sonnabend ............... 526/313
5,231,131 A * 7/1993 Chu et al. .................. 524/504
5,708,095 A * 1/1998 Grezzo Page et al. ...... 525/301
6,011,098 A * 1/2000 Kashiwazaki et al. ...... 524/377
6,440,203 B2 * 8/2002 Kato ....................... 106/31.6
6,652,634 B1 * 11/2003 Akers, Jr. et al. ......... 106/31.13
6,758,559 B1 * 7/2004 Nakano et al. ............ 347/100
6,762,217 B2 * 7/2004 Wakabayashi et al. ..... 523/160
2001/0023265 A1 * 9/2001 Hidaka et al. ............. 523/161
2003/0032699 A1    2/2003 Wakabayashi et al.
2003/0108667 A1 * 6/2003 McIntyre et al. .......... 427/212

FOREIGN PATENT DOCUMENTS

EP        1110351 A * 7/2001

* cited by examiner

*Primary Examiner*—Callie Shosho
(74) *Attorney, Agent, or Firm*—John A. Brady

(57) ABSTRACT

This invention relates to polymeric dispersants useful in ink jet ink compositions. The graft polymers comprise monomers having electron rich functional groups, which exhibit favorable interactions with the surface of pigment particles thereby better stabilizing the pigment dispersion within the aqueous ink composition. The graft polymers also comprise hydrophobic monomers having the ability to form hydrogen bonding. The polymers of the present invention provide a dispersant that increases the smear resistance of pigmented inks, especially when used on photo or gelatin paper. The graft polymers also provide excellent chroma for printing. The present invention also relates to aqueous ink compositions which include those polymeric dispersants.

18 Claims, No Drawings

POLYMERIC DISPERSANTS TO IMPROVE SMEAR IN PRINTING

FIELD OF THE INVENTION

This invention relates to polymeric dispersants useful in ink jet ink compositions.

BACKGROUND OF THE INVENTION

Ink jet printing is a non-impact method of printing that involves ejecting ink from a nozzle onto paper or other print media. The actual ink ejection method may occur via several processes including pressurized nozzles, electrostatic fields, piezoelectric elements within an ink nozzle, and heaters for vapor phase bubble formation.

The composition of the ink is traditionally comprised of deionized water, a water soluble organic solvent, and a colorant. The colorant may be a soluble dye or insoluble pigment. Several problems, however, are associated with soluble dyes that are not applicable to insoluble pigments. These problems include poor water-fastness, poor light-fastness, poor thermal stability, facile oxidation, dye crystallization, and ink bleeding and feathering on the print medium. To circumvent these problems, use of a pigment as the colorant is preferred. Pigments generally have better light-fast and water-fast properties, are more resistant to oxidation, and have higher thermal stability.

Use of a pigment instead of an aqueous dye presents solubility problems since the pigments are insoluble in aqueous media. As a result, the insoluble pigment is generally stabilized in a dispersion by a polymeric dispersant. Generally speaking most pigment inks stabilized by polymers in aqueous media are based on an electrosteric stabilizing mechanism in which a hydrophobic group in the dispersant acts as an anchor adsorbed on the pigment particle surface through an acid-base relation, electron donor/acceptor relation, Van der Waals forces, or physical absorption. The hydrophilic group is extended into the aqueous medium to keep the dispersant soluble. This results in a competition in the dispersing process between the pigment particle and the polymer, the polymer and the solvent, and the pigment particle and the solvent.

In order to form a stable polymeric dispersion, several factors are considered. First, the polymer must be firmly adsorbed to the pigment surface to withstand shear force and the competition of other chemical species. This requires a careful match of the polarity of the pigment surface to the hydrophobic group in the dispersant. Second, the physical dimensions of the hydrophobic group in the dispersant must be adequate to fully cover the pigment surface, otherwise, the adsorbed polymer will act as a flocculent. Third, an electrostatic layer of a requisite thickness around the particle is needed to repulse aggregation of particles within the aqueous medium.

In addition, many polymeric dispersions do not have acceptable smear resistance ability for some particular applications such as on photo paper or gelatin paper. The smear resistance of ink comprising a pigment dispersion can be improved in several ways, such as adding a latex binder or more penetrant to the ink formulation. But, in practice, penetrants reduce optical density and chroma, and binders may not work on photo paper coating. Therefore, rather than attempting to increase the smear resistance of pigment inks through the use of additives, the polymers of the present invention provide a dispersant that increases the smear resistance of pigmented inks, especially when used on photo or gelatin paper. The polymers of the present invention also provide excellent chroma for printing on photo paper.

SUMMARY OF THE INVENTION

The present invention relates to graft copolymers, useful as dispersants in ink jet ink compositions, having a weight average molecular weight from 3,000 to 13,000. The graft copolymers comprise monomers having electron rich functional groups, which exhibit favorable interactions with the surface of pigment particles thereby better stabilizing the pigment dispersion within the aqueous ink composition. The graft copolymers also comprise hydrophobic monomers having the ability to form hydrogen bonding.

In one aspect, the graft polymers of the present invention comprise: a hydrophilic polymeric segment; a hydrophobic polymeric segment comprising an hydroxyalkyl methacrylate or an hydroxyalkyl acrylate; and a polymeric stabilizing segment. The stabilizing segment comprises an electron rich aromatic functional group, which exhibits favorable interactions with the surface functional groups of pigment particles.

The present invention also relates to aqueous ink compositions which include those polymeric dispersants. Specifically, the dispersant compositions of the present invention for use in ink jet printers comprises from about 0.1% to about 10% of an insoluble pigment, from about 0.1% to about 10% of the polymeric dispersant described above, and an aqueous carrier.

All percentages and ratios, used herein, are "by weight" unless otherwise specified. All molecular weights, used herein, are weight average molecular weights unless otherwise specified. As used herein, "pigment" refers to an insoluble colorant (including organic and inorganic pigments.) Further details and advantages of the present invention are set forth below in the following more detailed description.

DETAILED DESCRIPTION OF THE INVENTION

The present invention relates to graft polymeric dispersants used to stabilize aqueous pigment ink compositions, as well as pigment ink compositions containing those dispersants. The graft polymers of the present invention have an average weight molecular weight of from about 3,000 to about 13,000, preferably of from about 5,000 to about 9,000. The graft polymers exhibit favorable interactions with pigment particles and with gelatin coatings. These favorable interactions serve to increase the smear resistance of the dispersion relative to conventional pigment dispersions. Also, the chroma and waterfastness of the dispersions is improved. Finally, the graft polymers provide for the production of pigment inks having improved stability, flexibility for ink formation, and excellent print quality as compared to conventional inks with conventional pigment dispersions.

Smear resistance on photo paper, especially on gelatin paper, is a significant problem for pigmented inks comprising a pigment dispersion. Most gelatin paper is designed for use with dye based inks. When conventional pigmented inks are printed on gelatin based paper, the pigmented dispersion remains on the surface of the gelatin coating and is susceptible to smearing or smudging. Increasing the amount of the hydrophilic portion, such as methacrylic acid, of the polymeric dispersant has been found to reduce the smear characteristics of pigmented inks on gelatin paper. But, increasing the amount of the hydrophilic portion can reduce the waterfastness of the pigmented inks and can reduce the gloss of the gelatin paper. As a result, a polymer comprising hydrophobic monomeric units that possess a similar hydrogen bonding ability of to that of typical hydrophilic monomeric units was needed. By retaining the ability to hydrogen bond, the hydrophobic monomeric units of the present invention increase the overall interaction of the polymer with gelatin coatings. At the same time, the waterfastness of the pigmented inks is not necessarily sacrificed. In addition, the hydrogen bonding ability of the hydrophobic monomeric units can increase the overall interaction of the polymer with pigments.

The polymers of the present invention are graft copolymers comprising monomers having electron rich aromatic functional groups, which exhibit favorable interactions with the surface functional groups of pigment particles. The graft polymers of the present invention comprise at least three distinct segments: a hydrophilic polymeric segment; a hydrophobic polymeric segment comprising an hydroxyalkyl methacrylate or an hydroxyalkyl acrylate; and a stabilizing polymeric segment comprising an aromatic group. Each of these segments is described in detail below.

The hydrophilic polymeric segment of the graft polymer comprises a hydrophilic monomeric unit and is responsible for controlling polymer solubility in the ink composition. Therefore, a monomer containing hydrophilic functional groups is preferred to ensure adequate solubility. Suitable hydrophilic functional groups will be known to those skilled in the art. Hydrophilic functional groups that can ensure adequate solubility include carboxylic acid groups, sulfonic acid groups, phosphate groups, and amino groups. The hydrophilic polymeric segment may comprise acrylic acid, methacrylic acid, acrylamidoalkylsulfonic acid, styrene sulfonic acid, or other acid, amide or amine (quaternary amine) containing monomers. In an embodiment, the hydrophilic polymeric segment comprises a methacrylic acid (MAA) polymer, or a copolymer thereof. In other embodiments, the hydrophilic segment may comprise a methacrylic acid copolymer with another monomer, such as styrene sulfonic acid. Other suitable polymeric monomers will be known to those skilled in the art. Suitable monomers are preferably those which do not interfere with the hydrophilic character of the segment. Different acid or amine groups may be used together. Longer hydrophilic segments help to ensure that the hydrophilic polymeric segment stabilizes the dispersant. The hydrophilic polymeric segment must be long present in a high enough mole % such that it can provide a stabilizing function to the graft polymer dispersant in an aqueous ink formulation. The hydrophilic polymeric segment should also maintain gloss when printing on photo paper.

In embodiments, the number of hydrophilic monomeric units ranges from 4 to 40 units. In preferred embodiments, the mole % of hydrophilic monomeric units ranges from about 18 to 84%. In other preferred embodiments, the mole % of hydrophilic monomeric units is about 50%. In a preferred embodiment, the graft polymer of the present invention comprises a hydrophilic segment comprising a hydrophilic monomeric unit comprising methacrylic acid.

The hydrophobic polymeric segment comprises a hydrophobic monomeric unit comprising an hydroxyalkyl methacrylate or an hydroxyalkyl acrylate. The present invention has found that having a hydrophobic polymeric segment that possesses the ability to form hydrogen bonding increases the overall interaction of the polymer with gelatin coatings and increases resistance to smear. At the same time, the waterfastness of the pigmented inks is not necessarily sacrificed.

In addition, the hydrogen bonding ability of the hydrophobic polymeric segment can increase the overall interaction of the graft polymer with pigments. Suitable hydroxyalkyl methacrylates include 2-hydroxyethyl methacrylate, 3-hydroxypropyl methacrylate, 4-hydroxybutyl methacrylate, 2-hydroxypropyl methacrylate, 2-hydroxybutyl methacrylate, and 3-hydroxybutyl methacrylate. Suitable hydroxyalkyl acrylates include 2-hydroxyethyl acrylate, 3-hydroxypropyl acrylate, 4-hydroxybutyl acrylate, 2-hydroxypropyl acrylate, 2-hydroxybutyl acrylate, and 3-hydroxybutyl acrylate. In an embodiment, the hydrophobic segment comprises 2-hydroxyethyl methacrylate. In preferred embodiments, the mole % of hydroxyalkyl methacrylate or hydroxyalkyl acrylate ranges from about 13 to 50%. In other preferred embodiments, the mole % of hydroxyalkyl methacrylate or hydroxyalkyl acrylate is about 30%.

The stabilizing polymeric segment is responsible for anchoring the graft polymeric dispersant to a pigment particle. The stabilizing polymeric segment comprises a stabilizing monomer unit comprising an electron rich functional group. The stabilizing monomer units have a molecular weight of from about 100 to about 2000, preferably from about 400 to about 1,600. The stabilizing monomer units include a moiety that enables it to polymerize into the remainder of the graft polymer. This can be accomplished through a vinyl ester group such as an acrylate, methacrylate, or crotonate group. Preferred stabilizing segments are polymerized into the remainder of the graft polymer through the inclusion of an acrylate group or a methacrylate group. In embodiments of the graft polymers, the mole % of any particular stabilizing monomer unit ranges from about 1.5 to 50%. In preferred embodiments, the mole % of any particular stabilizing monomer unit is about 20%.

In addition to a moiety that enables it to polymerize into the remainder of the graft polymer, a stabilizing monomeric unit comprises a hydrophobic head and a hydrophilic tail. The hydrophobic head comprises an electron rich aromatic functional group capable of stabilizing the pigment dispersion. In an embodiment of the stabilizing segment, the hydrophobic head of a stabilizing monomeric unit comprises the formula:

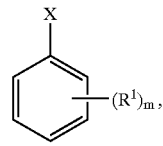

wherein m is an integer from 1 to 3, X comprises a linker group, preferably —O—, —NH— or —S—, and each $R^1$ independently comprises a hydroxy, —$C_1$–$C_9$ alkyl, —$C_1$–$C_9$ alkylene-aryl, or heteroaryl group. Examples of a —$C_1$–$C_9$ alkyl groups include, but are not limited to, methyl, n-butyl, t-butyl, n-pentyl, isobutyl, isopropyl, n-pentyl, hexyl, octyl, isooctyl, nonyl, and the like. Examples of —$C_1$–$C_9$ alkylene-aryl groups include, but are not limited to, 1-phenylethylene. Examples of heteroaryl groups include, but are not limited to, furan, thiophene, pyrrole, imidazole, pyrazole, triazole, tetrazole, thiazole, oxazole, isoxazole, oxadiazole, thiadiazole, isothiazole, pyridine, pyridazine, pyrazine, pyrimidine, quinoline, isoquinoline, quinazoline, benzofuran, 1,2,3-benzotriazole, indole, and indazole, and the like. The hydrophilic tail comprises a —$(OCH_2CH_2)_n$— or —$[OCH(CH_3)CH_2]_n$— group, wherein n is from 0 to 50.

One end of the hydrophilic tail is bonded to the hydrophobic head through the linker group X and the other end of the hydrophilic tail is bonded to a moiety that enables the stabilizing monomeric unit to polymerize with the remainder of the graft polymer.

Examples of stabilizing monomeric units include, but are not limited to, nonylphenoxy poly(propyleneoxy)-acrylate (containing from 1 to about 40 moles of propylene oxide), nonylphenoxy poly(propyleneoxy)-methacrylate (containing from 1 to about 40 moles of propylene oxide), nonylphenoxy poly(propyleneoxy)-crotonate (containing from about 5 to about 40 moles of propylene oxide), bis-[nonylphenoxy poly(propyleneoxy)]-fumarate (containing from about 5 to about 40 moles of propylene oxide), phenoxypoly(propyleneoxy)acrylate (containing from about 5 to about 40 moles of propylene oxide), 2,4,6-tris-(1-phenylethyl)phenoxy poly(ethyleneoxy)methacrylate and its di- and mono-derivates (containing from about 1 to about 40 moles of ethylene oxide). Mixtures of these materials may be used.

Preferred stabilizing segments which may be used in the graft polymers of the present invention include nonylphenol acrylate, nonylphenol methacrylate, nonylphenoxy poly(propyleneoxy)$_n$ methacrylate, wherein n is from 1 to about 40, preferably from 2 to about 15; nonylphenoxy poly(propyleneoxy)$_n$ acrylate, wherein n is from 1 to about 40, preferably from about 2 to about 15; 2,4,6-tris-(1-phenylethyl)phenoxy poly(ethyleneoxy)$_n$ methacrylate and its di- and mono-derivatives, wherein n is from 1 to about 40, preferably from about 2 to 25.

In particularly preferred embodiments, $R^1$ comprises a nonyl group or a 1-phenylethylene group, X comprises —O—, and n is from 2 to 25. In embodiments where $R^1$ comprises a nonyl group, the hydrophilic tail preferably comprises a —[OCH(CH$_3$)CH$_2$]$_n$— group, m is 1, and n is from 2 to 5. In embodiments where $R^1$ comprises a styrene group (i.e., 1-phenylethylene), the hydrophilic tail preferably comprises a —(OCH$_2$CH$_2$)$_n$— group, m is 3, and n is 25. Examples of preferred stabilizing monomeric units include, but are not limited to, SIPOMER/SEM 25™ (tristyrylphenol polyethyleneoxy methacrylate), purchased from Rhodia Inc.; 2,4,6-tris-(1-phenylethyl)phenoxy poly(ethyleneoxy)methacrylate and its di- and mono-derivates; and nonylphenoxy poly(propyleneoxy)acrylates, obtainable from Toagosei Company under the product name M-117.

It is noted herein that the end groups on the dispersants of this invention are not limited. For illustrative purposes, they can include thio-substituted hydrocarbons, as well as hydrogen. Moreover, it is also noted, however, that it is within the scope of this invention for all structural monomer units represented herein to be randomly dispersed throughout the polymer backbone.

In another embodiment of the present invention, the graft polymer comprises randomly distributed monomer units, wherein the hydrophilic polymeric segment comprises monomer units of the formula:

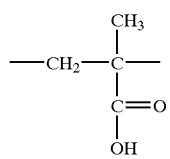

wherein the monomer is present in 18 to 84 mole %, preferably 50 mole %;

wherein the hydrophobic polymeric segment comprises monomer units of the formula;

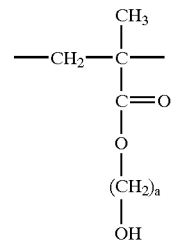

wherein a is an integer from 1 to 9, preferably 2, and the monomer is present in 13 to 50 mole %, preferably 30 mole %;

wherein the stabilizing polymeric segment comprises monomer units of formulae:

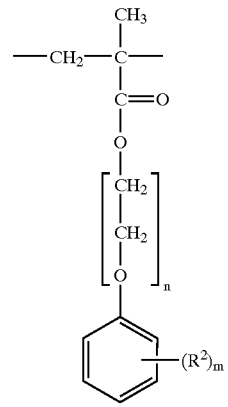

wherein n is an integer from 1 to 25, preferably 25; m is an integer from 1 to 3; preferably 3; and each $R^2$ independently comprises a $C_1$–$C_9$ alkyl, or —$C_1$–$C_9$ alkylene-aryl group, provided that at least one of said $R^2$ comprises a —$C_1$–$C_9$ alkylene-aryl group, $R^2$ preferably comprises 1-phenylethyl; and the monomer is present in 1.5 to 50 mole %, preferably 20 mole %; and

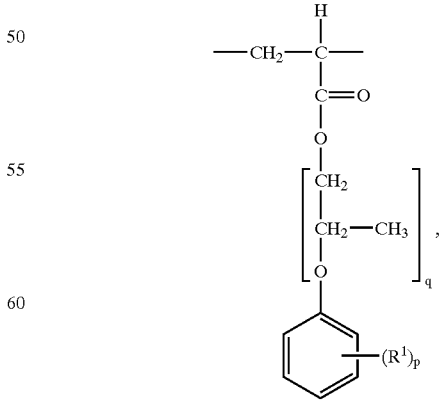

wherein q is an integer from 2 to 15, preferably from 2 to 5; p is an integer from 1 to 3, preferably 1; and each $R^1$ independently comprises a $C_1$–$C_9$ alkyl, or —$C_1$–$C_9$ alkylene-aryl group, provided that at least one of said $R^1$ comprises a —$C_1$–$C_9$ alkyl group, $R^1$ preferably comprises nonyl; and the monomer is present in 1.5 to 50 mole %, preferably 20 mole %.

The graft copolymers of the present invention can be made by standard synthetic techniques such as those described in Odian's *Principles of Polymerization*, $3^{rd}$ Edition, John Wiley and Sons, Inc. (1991), the disclosure of which is incorporated herein by reference. Free radical polymerization is the preferred method of synthesis. The specified monomer poly(ethylene glycol) 2,4,6-tris(1-phenylethyl)phenyl ether methacrylate and its di- and mono-derivatives may also be purchased from Rhodia Inc. as SIPOMER/SEM 25™, or synthesized from SynFac® (Milliken Inc.) or SOPROPHOR™ (Rhodia Inc.) through conventional synthetic methods. Also, nonylphenoxy poly(propyleneoxy)acrylates are obtained from Toagosei Company.

The free radical polymerization reaction utilizes initiators and chain transfer agents to control the polymer molecular weight and terminate the reaction. Any conventional free radical initiator and chain transfer agent materials known in the art may be used in the present invention as long as they are compatible with the reactants being utilized. Suitable free radical initiators include the azo-type and peroxide-type initiators. Preferred azo-type initiators include dimethyl 2,2'-azobisisobutyrate, and AIBN™ (Dupont). Suitable chain transfer agents include $C_1$–$C_{20}$ alkylthiol groups, preferably $C_8$–$C_{12}$ alkylthiol groups. Particularly preferred is n-$C_{12}$ thiol. Other appropriate chain transfer agents include phenylalkyl mercaptans, or 3-mercapto-1,2-propanediol.

Ink compositions of the present invention comprise the graft polymer dispersant compositions of the present invention, an insoluble pigment, and an aqueous carrier. A wide variety of organic and inorganic pigments, alone or in combination, may be selected for use in the aqueous inks of the present invention. The key selection criterion for a pigment are that it must be dispersible in the aqueous medium with the aid of the graft polymer of the present invention. The term "pigment", as used herein, means an insoluble colorant. The selected pigment may be used in dry or wet form.

The aqueous ink compositions of the present invention comprise from about 0.1% to about 10% of an insoluble pigment, from about 0.1% to about 10%, preferably from about 0.5% to about 5%, of the graft polymer dispersant described above, and an aqueous carrier.

Thus, the aqueous ink compositions of the present invention comprise the graft polymer dispersant compositions of the present invention, an insoluble pigment, and an aqueous carrier, wherein the graft polymer dispersant comprises a hydrophilic polymeric segment; a hydrophobic polymeric segment comprising an hydroxyalkyl methacrylate or an hydroxyalkyl acrylate; and a stabilizing segment comprising an aromatic group.

The hydrophilic polymeric segment of the graft polymeric dispersant used in the aqueous ink compositions of the present invention may comprise acrylic acid, methacrylic acid, acrylamidoalkylsulfonic acid, styrene sulfonic acid, or other acid, amide or amine (quaternary amine) containing monomers. In an embodiment, the hydrophilic polymeric segment comprises a methacrylic acid (MAA) polymer, or a copolymer thereof. In other embodiments, the hydrophilic polymeric segment may comprise a methacrylic acid copolymer with another monomer, such as styrene sulfonic acid. Other suitable monomers will be known to those skilled in the art. Suitable hydrophilic monomers are preferably those which do not interfere with the hydrophilic character of the segment. Different acid or amine groups may be used together. Longer hydrophilic segments help to ensure that the hydrophilic polymeric segment stabilizes the dispersant. The hydrophilic polymeric segment must be present in a high enough mole % such that it can provide a stabilizing function to the graft polymer dispersant in the aqueous ink formulation. The hydrophilic polymeric segment should also maintain gloss when printing on photo paper.

In embodiments, the number of hydrophilic monomeric units ranges from 4 to 40 units. In preferred embodiments, the mole % of hydrophilic monomeric units ranges from about 18 to 84%. In other preferred embodiments, the mole % of hydrophilic monomeric units is about 50%. In a preferred embodiment, the aqueous ink compositions comprise a graft polymer dispersant comprising a hydrophilic polymeric segment comprising a hydrophilic monomeric unit comprising methacrylic acid.

The hydrophobic polymeric segment of the graft polymeric dispersant used in the aqueous ink compositions of the present invention comprises a hydrophobic monomeric unit comprising an hydroxyalkyl methacrylate. Suitable hydroxyalkyl methacrylates include 2-hydroxyethyl methacrylate, 3-hydroxypropyl methacrylate, 4-hydroxybutyl methacrylate, 2-hydroxypropyl methacrylate, 2-hydroxybutyl methacrylate, and 3-hydroxybutyl methacrylate. Suitable hydroxyalkyl acrylates include 2-hydroxyethyl acrylate, 3-hydroxypropyl acrylate, 4-hydroxybutyl acrylate, 2-hydroxypropyl acrylate, 2-hydroxybutyl acrylate, and 3-hydroxybutyl acrylate. In an embodiment, the hydrophobic segment comprises 2-hydroxyethyl methacrylate. In preferred embodiments, the mole % of hydroxyalkyl methacrylate or hydroxyalkyl acrylate ranges from about 13 to 50%. In other preferred embodiments, the mole % of hydroxyalkyl methacrylate or hydroxyalkyl acrylate is about 30%.

The stabilizing polymeric segment of the graft polymeric dispersant used in the aqueous ink compositions of the present invention comprises a stabilizing monomer unit comprising an electron rich functional group. The stabilizing monomer units have a molecular weight of from about 100 to about 2000, preferably from about 400 to about 1,600. The stabilizing monomer units include a moiety that enables it to polymerize into the remainder of the graft polymer. This can be accomplished through a vinyl ester group such as an acrylate, methacrylate, or crotonate group. Preferred stabilizing segments are polymerized into the remainder of the graft polymer through the inclusion of an acrylate group or a methacrylate group. In embodiments of the graft polymers, the mole % of any particular stabilizing monomer unit ranges from about 1.5 to 50%. In preferred embodiments, the mole % of any particular stabilizing monomer unit is about 20%.

In addition to a moiety that enables it to polymerize into the remainder of the graft polymer, a stabilizing monomeric unit of the graft polymeric dispersant used in the aqueous ink compositions of the present invention comprises a hydrophobic head and a hydrophilic tail. The hydrophobic head comprises an electron rich aromatic functional group capable of stabilizing the pigment dispersion. In an embodiment of the stabilizing segment, the hydrophobic head of a stabilizing monomeric unit comprises the formula:

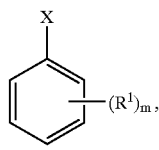

wherein m is an integer from 1 to 3, X comprises a linker group, preferably —O—, —NH— or —S—, and each $R^1$ independently comprises a hydroxy, —$C_1$–$C_9$ alkyl, —$C_1$–$C_9$ alkylene-aryl, or heteroaryl group. Examples of a —$C_1$–$C_9$ alkyl groups include, but are not limited to, methyl, n-butyl, t-butyl, n-pentyl, isobutyl, isopropyl, n-pentyl, hexyl, octyl, isooctyl, nonyl, and the like. Examples of —$C_1$–$C_9$ alkylene-aryl groups include, but are not limited to, 1-phenylethylene. Examples of heteroaryl groups include, but are not limited to, furan, thiophene, pyrrole, imidazole, pyrazole, triazole, tetrazole, thiazole, oxazole, isoxazole, oxadiazole, thiadiazole, isothiazole, pyridine, pyridazine, pyrazine, pyrimidine, quinoline, isoquinoline, quinazoline, benzofuran, 1,2,3-benzotriazole, indole, and indazole, and the like. The hydrophilic tail comprises a —$(OCH_2CH_2)_n$— or —$[OCH(CH_3)CH_2]_n$— group, wherein n is from 0 to 50. One end of the hydrophilic tail is bonded to the hydrophobic head through the linker group X and the other end of the hydrophilic tail is bonded to a moiety that enables the stabilizing monomeric unit to polymerize with the remainder of the graft polymer.

Examples of stabilizing monomeric units of the graft polymeric dispersant used in the aqueous ink compositions of the present invention include, but are not limited to, nonylphenoxy poly(propyleneoxy)-acrylate (containing from 1 to about 40 moles of propylene oxide), nonylphenoxy poly(propyleneoxy)-methacrylate (containing from 1 to about 40 moles of propylene oxide), nonylphenoxy poly(propyleneoxy)-crotonate (containing from about 5 to about 40 moles of propylene oxide), bis-[nonylphenoxy poly(propyleneoxy)]-fumarate (containing from about 5 to about 40 moles of propylene oxide), phenoxypoly(propylene)acrylate (containing from about 5 to about 40 moles of propylene oxide), 2,4,6-tris-(1-phenylethyl)phenoxy poly(ethyleneoxy)methacrylate and its di- and mono-derivates (containing from about 1 to about 40 moles of ethylene oxide). Mixtures of these materials may be used.

Preferred stabilizing segments of the graft polymeric dispersant used in the aqueous ink compositions of the present invention may comprise nonylphenol acrylate, nonylphenol methacrylate, nonylphenoxy poly(propyleneoxy)$_n$ methacrylate, wherein n is from 1 to about 40, preferably from 2 to about 15; nonylphenoxy poly(propyleneoxy)$_n$ acrylate, wherein n is from 1 to about 40, preferably from about 2 to about 15; 2,4,6-tris-(1-phenylethyl)phenoxy poly(ethyleneoxy)$_n$ methacrylate and its di- and mono-derivatives, wherein n is from 1 to about 40, preferably from about 2 to 25.

In particularly preferred embodiments, $R^1$ comprises a nonyl group or a 1-phenylethylene group, X comprises —O—, and n is from 2 to 25. In embodiments where $R^1$ comprises a nonyl group, the hydrophilic tail preferably comprises a —$[OCH(CH_3)CH_2]_n$— group, m is 1, and n is from 2 to 5. In embodiments where $R^1$ comprises a styrene group (i.e., 1-phenylethylene), the hydrophilic tail preferably comprises a —$(OCH_2CH_2)_n$— group, m is 3, and n is 25. Examples of preferred stabilizing monomeric units include, but are not limited to, SIPOMER/SEM 25™ (tristyrylphenol polyethyleneoxy methacrylate), purchased from Rhodia Inc.; 2,4,6-tris-(1-phenylethyl)phenoxy poly(ethyleneoxy)methacrylate and its di- and mono-derivates; and nonylphenoxy poly(propylencoxy)acrylates, obtainable from Toagosei Company under the product name M-117.

It is noted herein that the end groups on the dispersants of this invention are not limited. For illustrative purposes, they can include thio-substituted hydrocarbons, as well as hydrogen. Moreover, it is also noted, however, that it is within the scope of this invention for all structural monomer units represented herein to be randomly dispersed throughout the polymer backbone.

In another embodiment of the present invention, the graft polymer used in the aqueous ink compositions of the present invention comprises randomly distributed monomer units, wherein the hydrophilic polymeric segment comprises monomer units of the formula:

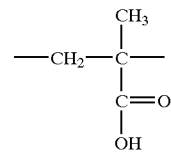

wherein the monomer is present in 18 to 84 mole %, preferably 50 mole %;

wherein the hydrophobic polymeric segment comprises monomer units of the formula:

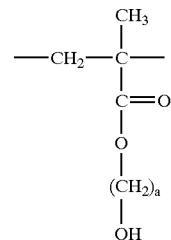

wherein a is an integer from 1 to 9, preferably 2, and the monomer is present in 13 to 50 mole %, preferably 30 mole %;

wherein the stabilizing polymeric segment comprises monomer units of the formulae:

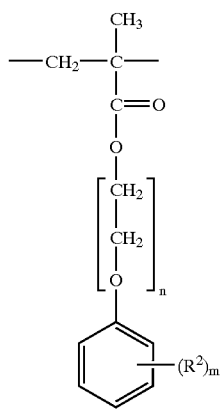

wherein n is an integer from 1 to 25, preferably 25; m is an integer from 1 to 3; preferably 3; and each $R^2$ independently comprises a $C_1$–$C_9$ alkyl, or —$C_1$–$C_9$ alkylene-aryl group, provided that at least one of said $R^2$ comprises a —$C_1$–$C_9$ alkylene-aryl group, $R^2$ preferably comprises 1-phenylethyl; and the monomer is present in 1.5 to 50 mole %, preferably 20 mole %; and

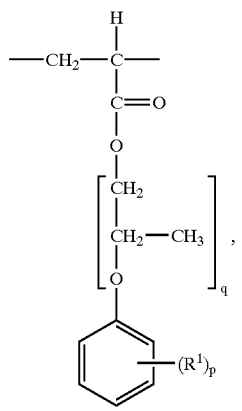

wherein q is an integer from 2 to 15, preferably from 2 to 5; p is an integer from 1 to 3, preferably 1; and each $R^1$ independently comprises a $C_1$–$C_9$ alkyl, or —$C_1$–$C_9$ alkylene-aryl group, provided that at least one of said $R^1$ comprises a —$C_1$–$C_9$ alkyl group, $R^1$ preferably comprises nonyl; and the monomer is present in 1.5 to 50 mole %, preferably 20 mole %.

The amount of pigment used in the aqueous inks may vary depending on their structure, but generally the pigments are used in a range of from about 0.1% to about 10%, preferably of from about 2 to about 6%, by weight of the ink composition. The pigment to dispersant (weight) ratio is preferably about 1:1, but may vary from about 1:1 to about 9:1.

Suitable pigments include organic and inorganic pigments of a particle size sufficient to permit free flow of the ink through the ink jet printing device, especially at the ejecting nozzles that usually have a diameter ranging from about 10 microns to 50 microns. Thus, a suitable pigment particle size is from about 0.05 to about 15, preferably from about 0.05 to about 5, and more preferably from about 0.05 to about 0.5, microns. Pigments suitable for use in the present invention include azo pigments, such as azo lakes, insoluble azo pigments, condensed azo pigments and chelate azo pigments, polycyclic pigments, perylene pigments, anthraquinone pigments, quinacridone pigments, dioxazine pigments, thioindigo pigments, isoindolinone pigments, quinophthalone pigments, and dry lakes. Suitable organic pigments include nitro pigments, nitroso pigments, aniline black and daylight fluorescent pigments. Preferred pigments include carbon black, Pigment Red 122, Pigment Red 202, Pigment Yellow 74, Pigment Yellow 128, Pigment Yellow 138, Pigment Yellow 155, Pigment Blue 15:3 and Pigment Blue 15:4.

The third component of the aqueous ink composition of the present invention is the aqueous carrier medium which is generally present at from about 70% to about 99% of the composition. The aqueous carrier medium comprises water (preferably deionized water) and, preferably, at least one water soluble organic solvent. Selection of a suitable carrier mixture depends on the requirements of the specific application involved, such as desired surface tension and viscosity, the selected pigment, the desired drying time of the ink, and the type of paper onto which the ink will be printed. Representative examples of water soluble organic solvents that may be selected include (1) alcohols, such as methyl alcohol, ethyl alcohol, n-propyl alcohol, isopropyl alcohol, n-butyl alcohol, sec-butyl alcohol, t-butyl alcohol, iso-butyl alcohol, furfuryl alcohol, and tetrahydrofurfuryl alcohol; (2) ketones or ketoalcohols, such as acetone, methyl ethyl ketone and diacetone alcohol; (3) ethers, such as tetrahydrofuran and dioxane; (4) esters, such as ethyl acetate, ethyl lactate, ethylene carbonate and propylene carbonate; (5) polyhydric alcohols, such as ethylene glycol, diethylene glycol, triethylene glycol, propylene glycol, tetraethylene glycol, polyethylene glycol, glycerol, 2-methyl-2,4-pentanediol, 1,2,6-hexanetriol and thiodiglycol; (6) lower alkyl mono- or di-ethers derived from alkylene glycols, such as ethylene glycol monomethyl (or monoethyl) ether, diethylene glycol monomethyl (or monoethyl) ether, propylene glycol monomethyl (or monoethyl) ether, triethylene glycol monomethyl (or monoethyl) ether and diethylene glycol dimethyl (or diethyl) ether; (7) nitrogen-containing cyclic compounds, such as pyrrolidone, N-methyl-2-pyrrolidone, and 1,3-dimethyl-2-imidazolidinone; and (8) sulfur-containing compounds, such as dimethyl sulfoxide and tetramethylene sulfone. Other useful organic solvents include lactones and lactams. Mixtures of these solvents may be used in the present invention.

The aqueous ink compositions of the present invention may further comprise a humectant mixture. Preferred humectants include, but are not limited to, bis-hydroxy terminated thioethers, lactams, and polyalkylene glycols. The amount of humectant in an ink formulation can range from 0 to 40 weight percent, preferably from 15 to 25 weight percent.

The ink compositions may further comprise surfactants to modify the surface tension of the ink and to control the penetration of the ink into the paper. Such surfactants are included in the ink compositions, and are not a component of the dispersant. Suitable surfactants include, but are not limited to, nonionic, amphoteric and ionic surfactants. Preferred surfactants include, but are not limited to, alkyl sulfate, nonyl phenyl polyethylene glycol, SILWET® (OSI Sealants, Inc.), TERGITOL® (Union Carbide) and SURFYNOL® (Air Products and Chemicals, Inc.).

Other additives, such as biocides, viscosity modifiers, penetrants, anti-kogation agents, anti-curling agents, chelating agents, anti-bleed agents, binders and buffers may be added to the ink composition at their art established levels. A preferred biocide includes, but is not limited to, Proxel® GXL (Zeneca).

The process for preparing pigmented ink jet inks typically requires that the links have their particles reduced in size using a grinding mill. The mean volume pigment particle size is normally less than about 200 nm, preferably less than about 140 nm. This particle size requirement is achieved by extensive shearing of the pigment particles using small grinding media. Useful grinding media includes spherical ceramic particles having a highly smooth and uniform exterior surface, a high density and high hardness. A preferred grinding medium for use in preparing the inks of the present invention is the material commercially available under the name YTZ Ceramic Beads, commercially available from S. E. Firestone Associates, Philadelphia, Pa. and manufactured by Nippon Kagaku Togyo.

In another aspect, the present invention provides a composition comprising a pigment and a graft polymer as described above. Thus, the present invention provides a composition comprising a pigment and a graft polymer comprising a hydrophilic polymeric segment; a hydrophobic polymeric segment comprising a hydrophobic monomeric unit comprising a hydroxyalkyl methacrylate ester; and a stabilizing segment comprising an aromatic functional group.

In another aspect, the present invention provides an ink set comprising at least one aqueous ink composition comprising a pigment and a graft polymer as described above. Thus, the present invention provides an ink set comprising at least one aqueous ink composition comprising from about 0.1% to about 10% of a pigment, and from about 0.1% to about 10% of a graft polymer comprising: a hydrophilic polymeric segment; a hydrophobic polymeric segment comprising a hydrophobic monomeric unit comprising a hydroxyalkyl methacrylate ester; and a stabilizing segment comprising an aromatic functional group.

EXAMPLES

The following examples are detailed descriptions of methods of preparation and use of the polymeric dispersants and the ink compositions of the present invention. The detailed descriptions fall within the scope of, and serve to exemplify, the more general description set forth above. The examples are presented for illustrative purposes only, and are not intended as a restriction on the scope of the invention.

Example 1

A graft polymer dispersant of the present invention is made as follows. A solution of methacrylic acid 24.0 g (0.28 mol), 2-hydroxyethyl methacrylate 20.0 g (0.153 mol), 4-nonylphenol poly(propyleneoxy)acrylate 45.0 g (0.11 mol), and dodecanethiol 4.0 g (0.02 mol), dimethyl 2,2'-azobisisobutyrate (V-601™) from Waco Chemical & Supply Co. 0.3 g are mixed in 75 mL isopropanol in a three neck round bottom flask which is equipped with a mechanical stirrer, a condenser and a thermometer. The chemicals are mixed together and degassed with nitrogen by repeated partial evacuation followed by nitrogen backfill using a Firestone Valve. The flask is back filled with the nitrogen, then immersed, in an oil bath and heated to about 75° C. for about 18 hours. A viscose solution is formed. The solution is dried in an explosion proof oven and the molecular weight is determined by gel permeation chromatography. The Mw of the resultant dried solution is about 8211 and the Mn is about 4523.

The polymer dispersant stock solution is prepared in the following manner: The dried powder of the dispersant is dissolved in deionized water with heating. The temperature is controlled below 50° C., the pH is adjusted to 7.5 by addition of 20% KOH drop wise.

Examples 2–20

The polymers of examples 2–20 (see table 1) were prepared using the procedure described in example 1, except that the amounts of monomers listed in table 1 were used. In table 1, MAA represents methacrylic acid monomer, HEMA represents 2-hydroxyethyl acrylic acid monomer, Nonyl-ppg represents 4-nonylphenol poly(propyleneoxy), acrylate (N=2–5), Tristyrene-peg represents poly(ethylene glycol), 2,4,6-tris(1-phenylethyl)phenyl ether methacrylate (N=25), Norbloc represents 2(2'-hydroxy-5'methacryloxyethylphenyl)-2H-benzotriazole, and the chain transfer reagent is dodecanethiol.

TABLE 1

| | Monomer Ingredients | | | | | | |
|---|---|---|---|---|---|---|---|
| Ex. | MAA (mol) | HEMA (mol) | Nonyl-ppg (mol) | Tristyrene-peg (mol) | Norbloc (mol) | Chain Transfer reagent (mole %) | mw |
| 2 | 0.3 | 0.1 | 0.1 | | | 3.7 | 4682 |
| 3 | 0.3 | 0.2 | 0.12 | | | 3.7 | 8247 |
| 4 | 0.3 | 0.2 | 0.097 | | | 3.8 | 7489 |
| 5 | 0.3 | 0.2 | 0.12 | | | 3.3 | 6727 |
| 6 | 0.13 | 0.06 | 0.06 | 0.008 | | 6.58 | 5975 |
| 7 | 0.13 | 0.06 | 0.09 | 0.008 | | 6.59 | 6491 |
| 8 | 0.186 | 0.06 | 0.06 | 0.016 | | 5.3 | 7487 |
| 9 | 0.186 | 0.06 | 0.06 | 0.03 | | 5.05 | 10333 |
| 10 | 0.186 | 0.09 | 0.05 | 0.03 | | 4.7 | 10276 |
| 11 | 0.22 | 0.03 | 0.06 | 0.03 | | 6.06 | 8906 |
| 12 | 0.18 | 0.18 | | 0.016 | | 3.5 | 7489 |
| 13 | 0.18 | 0.18 | | 0.03 | | 3.3 | 11414 |
| 14 | 0.18 | 0.3 | | 0.03 | | 3.3 | 10846 |
| 15 | 0.28 | | | 0.015 | 0.06 | 5.5 | 5842 |
| 16 | 0.28 | | | 0.03 | 0.06 | 5.4 | 7550 |
| 17 | 0.21 | 0.06 | | 0.02 | 0.06 | 5.7 | 6720 |
| 18 | 0.186 | 0.06 | | 0.024 | 0.048 | 5.3 | 7846 |

TABLE 1-continued

| | Monomer Ingredients | | | | | | |
|---|---|---|---|---|---|---|---|
| Ex. | MAA (mol) | HEMA (mol) | Nonyl- ppg (mol) | Tristyrene- peg (mol) | Norbloc (mol) | Chain Transfer reagent (mole %) | mw |
| 19 | 0.23 | 0.06 | | 0.03 | 0.048 | 5.4 | 7829 |
| 20 | 0.18 | 0.06 | | 0.032 | 0.048 | 5.3 | 8535 |

Each dispersant described in Examples 1–20 passed an oven stability test conducted at 60° C. for 90 days.

Example 21

An ink composition was prepared using the graft polymer dispersant described in Example 1.

Using the dispersant solution prepared according to the procedure in Example 1, a dispersant was prepared by mixing the dispersant solution with a pigment at a pigment-to-dispersant ratio of 1:1. The pigment and dispersant solution were mixed in a mechanical stirrer until no lumps were visible. The total percent solids of the dispersant solution was controlled at 20%. The mixture was then dispersed by an attrition process using a Szegvari attritor model 01 std with YTZ ceramic beads. The attrition process was typically performed for a minimum of five hours. However, longer times at controlled temperature can also be used. The pH was adjusted with 20% KOH solution to maintain the pH at 7.5. The dispersion particle size was <150 nm, as determined by Leeds and Northrop Microtrac UPA 150 measurement. The solution was then diluted to a final premix of 12–15% solids.

The ink was prepared by mixing 3% pigment by weight of the final premix with 5% by weight of 2-pyrrolidone, 5% by weight of polyethylene glycol (Mw 1000), 5% by weight of thioldiethanol, 1% by weight of 1,2-hexanediol, and the balance being deionized water.

Example 22

An ink composition was prepared using the same procedure as for the ink in Example 21, except the graft polymer of Example 2 was used as dispersant.

Example 23

An ink composition was prepared using the same procedure as for the ink in Example 21, except the graft polymer of Example 3 was used as dispersant.

Example 24

An ink composition was prepared using the same procedure as for the ink in Example 21, except the graft polymer of Example 4 was used as dispersant.

Example 25

An ink composition was prepared using the same procedure as for the ink in Example 21, except the graft polymer of Example 8 was used as dispersant.

Example 26

The inks in Examples 21–25 were printed and tested on various media. The results are summarized in table 2.

TABLE 2

| Media | | Ex. 21 | Ex. 22 | Ex. 23 | Ex. 24 | Ex. 25 | Comparative Pigment | Comparative Dye |
|---|---|---|---|---|---|---|---|---|
| 200% L | Glossy | 50 | 49.3 | 50.7 | 49.1 | 50.0 | 55.3 | 51.3 |
| 200% C | Glossy | 85.5 | 87.3 | 85.1 | 86.0 | 85.7 | 78.5 | 86.4 |
| 100% L | Glossy | 61.2 | 61.2 | 63.1 | 60.6 | 61.5 | 67.8 | 51.3 |
| 100% C | Glossy | 72.5 | 73.7 | 69.6 | 73.5 | 72.9 | 61.7 | 86.4 |
| 200% OD | Plain 1 | 0.9 | 0.86 | 0.83 | 0.88 | 0.93 | 0.83 | 1.07 (100%) |
| 200% OD | Plain 2 | 0.86 | 0.90 | 0.87 | 0.92 | 0.95 | 0.84 | 1.07 (100%) |
| Smear | Glossy | 0.8 | 0.8 | 1.2 | 1 | 1.5 | 3 | 0 |
| Waterfastness | Plain 1 | A | A | A | A | C | A | E (100%) |

In table 2, L and C represent color metrics and were measured using a Minolta Spectrometer, D65 source, 10 degrees aperture. Smear was graded qualitatively on a scale from 0 to 5, with 0 representing exceptional smear resistance and 5 representing poor smear resistance. Waterfastness was graded qualitatively after printed images were allowed to dry for 5 minutes and then submerged in water for 1 minute. Waterfastness was graded on a scale from A to E, with A representing exceptional waterfastness and E representing poor waterfastness.

The 100% and 200% in table 2 represents coverage, with 100% representing 600 dpi and 200% representing 1200 dpi.

Glossy media refers to Kodak premium glossy paper. Plain 1 media refers to Hammermill laser paper. Plain 2 media refers to Cascade X-9000 plain paper.

The comparative pigment ink was formulated using the same recipe as the one listed in Example 21 above with the exception that the dispersant used is the dispersant disclosed in U.S. Pat. No. 6,225,370. The comparative dye ink was formulated using a standard ink formulation with magenta dye disclosed in U.S. Pat. No. 5,254,160.

While various preferred embodiments, and Examples of the invention, have been described in detail and by way of illustration, it will be understood that various modifications and substitutions may be made in the described embodi-

We claim:

1. A graft polymer comprising:
(a) a hydrophilic polymeric segment;
(b) a hydrophobic polymeric segment comprising a hydrophobic monomeric unit comprising an hydroxyalkyl methacrylate or an hydroxyalkyl acrylate; and
(c) a stabilizing polymeric segment comprising an aromatic functional group,
wherein the stabilizing polymeric segment comprises a stabilizing monomeric unit comprising nonylphenol acrylate; nonylphenol methacrylate;
nonylphenoxy poly(propyleneoxy)$_n$methacrylate, wherein n is from 1 to about 40;
nonylphenoxy poly(propyleneoxy)$_n$acrylate, wherein n is from 1 to about 40; or
2,4,6-tris-(1-phenylethyl)phenoxy poly(ethyleneoxy)$_n$methoacrylate,
wherein n is from about 1 to about 40.

2. The graft polymer of claim 1, wherein the stabilizing polymeric segment comprises nonylphenoxy poly(propyleneoxy)$_n$acrylate, wherein n is from about 2 to about 15.

3. The graft polymer of claim 1, wherein the stabilizing polymeric segment comprises 2,4,6-tris-(1-phenylethyl)phenoxy poly(ethyleneoxy)$_n$methacrylate, wherein n is from about 2 to 25.

4. A graft polymer comprising:
(a) a hydrophilic polymeric segment;
(b) a hydrophobic polymeric segment comprising a hydrophobic monomeric unit comprising an hydroxyalkyl methacrylate or an hydroxyalkyl acrylate; and
(c) a stabilizing polymeric segment comprising an aromatic functional group,
wherein the stabilizing polymeric segment comprises a stabilizing monomeric unit comprising
(a) a hydrophobic head of the formula:

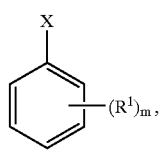

wherein m is an integer from 1 to 3, X comprises a linker group comprising —O—, —NH— or —S—, and each $R^1$ independently comprises a hydroxy, —$C_1$–$C_9$ alkyl, —$C_1$–$C_9$ alkylene-aryl, or heteroaryl group; and
(b) a hydrophilic tail comprising a —(OCH$_2$CH$_2$)$_n$— or —[OCH(CH$_3$)CH$_2$]$_n$— group, wherein n is from 0 to 50, wherein the hydrophilic tail is bonded to the hydrophobic head through the linker group X and the other end of the hydrophilic tail is bonded to a vinyl ester group moiety.

5. The graft polymer of claim 4, wherein m is from 1 to 3, $R^1$ comprises a nonyl group or a 1-phenylethylene group, X comprises —O—, and n is from 2 to 25.

6. The graft polymer of claim 5, wherein m is 1, $R^1$ comprises a nonyl group, the hydrophilic tail comprises a —[OCH(CH$_3$)CH$_2$]$_n$— group, and n is from 2 to 5.

7. The graft polymer of claim 5, wherein m is 3, $R^1$ comprises a 1-phenylethylene group, the hydrophilic tail comprises a —(OCH$_2$CH$_2$)$_n$— group, and n is 25.

8. A graft polymer comprising:
(a) a hydrophilic polymeric segment;
(b) a hydrophobic polymeric segment comprising a hydrophobic monomeric unit comprising an hydroxyalkyl methacrylate or an hydroxyalkyl acrylate; and
(c) a stabilizing polymeric segment comprising an aromatic functional group,
said graft polymer comprising randomly distributed monomer units
wherein
the hydrophilic polymeric segment comprises monomer units of the formula:

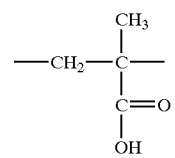

wherein the monomer is present in 18 to 84 mole %;
wherein
the hydrophobic polymeric segment comprises monomer units of the formula:

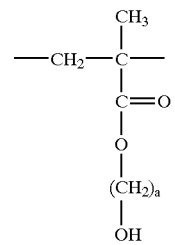

wherein a is an integer from 1 to 9, and the monomer is present in 13 to 50 mole %;
wherein
the stabilizing polymeric segment comprises monomer units of the formulae:

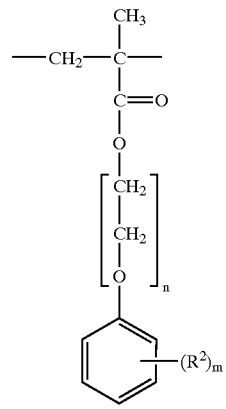

wherein n is an integer from 1 to 25; m is an integer from 1 to 3; and each $R^2$ independently comprises a $C_1$–$C_9$ alkyl, or —$C_1$–$C_9$ alkylene-aryl group, provided that at least one of said $R^2$ comprises a —$C_1$–$C_9$ alkylene-aryl group; and the monomer is present in 1.5 to 50 mole %; and

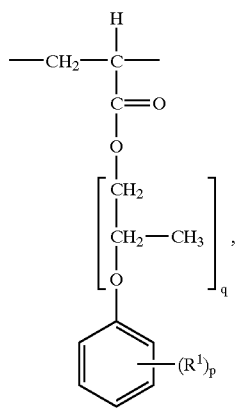

wherein q is an integer from 2 to 5; p is an integer from 1 to 3; and each $R^2$ independently comprises a $C_1$–$C_9$ alkyl, or —$C_1$–$C_9$ alkylene-aryl group, provided that at least one of said $R^1$ comprises a —$C_1$–$C_9$ alkyl group; and the monomer is present in 1.5 to 50 mole %.

9. The graft polymer of claim 8, wherein a is 2, n is 25, m is 3, q is from about 2 to 5, p is 1, $R^1$ comprises nonyl, and $R^2$ comprises 1-phenylethyl.

10. An aqueous ink composition for ink jet printers comprising from about 0.1% to about 10% of a pigment, and from about 0.1% to about 10% of a graft polymer comprising:
  (a) a hydrophilic polymeric segment;
  (b) a hydrophobic polymeric segment comprising a hydrophobic monomeric unit comprising an hydroxyalkyl methacrylate or an hydroxyalkyl acrylate; and
  (c) a stabilizing polymeric segment comprising an aromatic functional group;
wherein the stabilizing polymeric segment of the graft polymer comprises a stabilizing monomeric unit comprising nonylphenol acrylate; nonylphenol methacrylate; nonylphenoxy poly(propyleneoxy)$_n$methacrylate, wherein n is from 1 to about 40; nonylphenoxy poly(propyleneoxy)$_n$acrylate, wherein n is from 1 to about 40; or 2,4,6-tris-(1-phenylethyl) phenoxy poly(ethyleneoxy)$_n$methacrylate, wherein n is from about 1 to about 40.

11. The aqueous ink composition of claim 10, wherein the stabilizing polymeric segment of the graft polymer comprises nonylphenoxy poly(propyleneoxy)$_n$acrylate, wherein n is from about 2 to about 15.

12. The aqueous ink composition of claim 10, wherein the stabilizing polymeric segment of the graft polymer comprises 2,4,6-tris-(1-phenylethyl)phenoxy poly(ethyleneoxy)$_n$ methacrylate, wherein n is from about 2 to 25.

13. An aqueous ink composition for ink jet printers comprising from about 0.1% to about 10% of a pigment, and from about 0.1% to about 10% of a graft polymer comprising:
  (a) a hydrophilic polymeric segment;
  (b) a hydrophobic polymeric segment comprising a hydrophobic monomeric unit comprising an hydroxyalkyl methacrylate or an hydroxyalkyl acrylate; and
  (c) a stabilizing polymeric segment comprising an aromatic functional group, wherein the stabilizing polymeric segment of the graft polymer comprises a stabilizing monomeric unit comprising
  (a) a hydrophobic head of the formula:

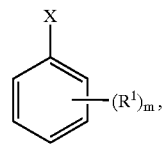

wherein m is an integer from 1 to 3, X comprises a linker group comprising —O—, —NH— or —S—, and each $R^1$ independently comprises a hydroxy, —$C_1$–$C_9$ alkyl, —$C_1$–$C_9$ alkylene-aryl, or heteroaryl group; and
  (b) a hydrophilic tail comprising a —(OCH$_2$CH$_2$)$_n$— or —[OCH(CH$_3$)CH$_2$]$_n$— group, wherein n is from 0 to 50, wherein the hydrophilic tail is bonded to the hydrophobic head through the linker group X and the other end of the hydrophilic tail is bonded to a vinyl ester group moiety.

14. The aqueous ink composition of claim 13, wherein the stabilizing polymeric segment of the graft polymer comprises a stabilizing monomeric unit comprising
  (a) said hydrophobic head of the formula:

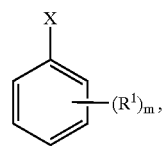

wherein the stabilizing polymeric segment m is from 1 to 3, $R^1$ comprises a nonyl group or a 1-phenylethylene group, X comprises —O—, and n is from 2 to 25.

15. The aqueous ink composition of claim 14, wherein the stabilizing polymeric segment of the graft polymer comprises a stabilizing monomeric unit comprising
  (a) said hydrophobic head of the formula:

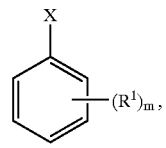

wherein m is 1, $R^1$ comprises a nonyl group, X comprises —O—; and
  (b) said hydrophilic tail comprising a —[OCH(CH$_3$)CH$_2$]$_n$— group, wherein n is from 2 to 5.

16. The aqueous ink composition of claim 14, wherein the stabilizing polymeric segment of the graft polymer comprises a stabilizing monomeric unit comprising (a) said hydrophobic head of the formula:

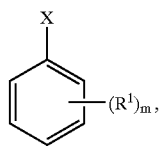

wherein m is 3, $R^2$ comprises a 1-phenylethylene group, X comprises —O—; and
(b) said hydrophilic tail comprising a —(OCH$_2$CH$_2$)$_n$— group, wherein n is 25.

17. An aqueous ink composition for ink jet printers comprising from about 0.1% to about 10% of a pigment, and from about 0.1% to about 10% of a graft polymer comprising:
(a) a hydrophilic polymeric segment;
(b) a hydrophobic polymeric segment comprising a hydrophobic monomeric unit comprising an hydroxyalkyl methacrylate or an hydroxyalkyl acrylate; and
(c) a stabilizing polymeric segment comprising an aromatic functional group,
wherein the graft polymer comprises randomly distributed monomer units
wherein the hydrophilic segment of the graft polymer comprises monomer units of the formula:

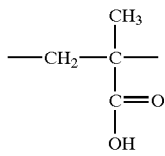

wherein the monomer is present in 18 to 84 mole %;
wherein
the hydrophobic segment of the graft polymer comprises monomer units of the formula:

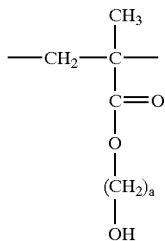

wherein a is an integer from 1 to 9, and the monomer is present in 13 to 50 mole %;

wherein
the stabilizing segment of the graft polymer comprises monomer units of the formulae:

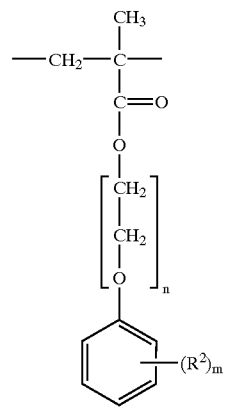

wherein n is an integer from 1 to 25; m is an integer from 1 to 3; and each $R^2$ independently comprises a $C_1$–$C_9$ alkyl, or —$C_1$–$C_9$ alkylene-aryl group, provided that at least one of said $R^2$ comprises a —$C_1$–$C_9$ alkylene-aryl group; and the monomer is present in 1.5 to 50 mole %; and

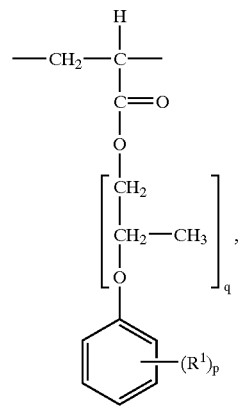

wherein q is an integer from 2 to 5; p is an integer from 1 to 3; and each $R^1$ independently comprises a —$C_1$–$C_9$ alkyl, or —$C_1$–$C_9$ alkylene-aryl group, provided that at least one of said $R^1$ comprises a —$C_1$–$C_9$ alkyl group; and the monomer is present in 1.5 to 50 mole %.

18. The graft polymer of claim 17, wherein a is 2, n is 25, m is 3, q is from about 2 to 5, p is 1, $R^1$ comprises nonyl, and $R^2$ comprises 1-phenylethyl.

* * * * *

UNITED STATES PATENT AND TRADEMARK OFFICE
CERTIFICATE OF CORRECTION

PATENT NO. : 6,984,701 B2
DATED : January 10, 2006
INVENTOR(S) : Paul Sacoto et al.

It is certified that error appears in the above-identified patent and that said Letters Patent is hereby corrected as shown below:

Column 19,
Line 21, replace "$R^2$" with -- $R^1$ --.

Signed and Sealed this

Twenty-first Day of March, 2006

JON W. DUDAS
*Director of the United States Patent and Trademark Office*